United States Patent
Bae et al.

(10) Patent No.: US 8,089,849 B2
(45) Date of Patent: Jan. 3, 2012

(54) HOLOGRAM OPTICAL DEVICE, AND COMPATIBLE OPTICAL PICKUP HAVING THE HOLOGRAM OPTICAL DEVICE AND OPTICAL INFORMATION STORAGE MEDIUM SYSTEM EMPLOYING THE COMPATIBLE OPTICAL PICKUP

(75) Inventors: Jae-cheol Bae, Suwon-si (KR); Tae-kyung Kim, Seoul (KR); Kyong-tae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 937 days.

(21) Appl. No.: 12/018,308

(22) Filed: Jan. 23, 2008

(65) Prior Publication Data

US 2008/0285419 A1 Nov. 20, 2008

(30) Foreign Application Priority Data

May 18, 2007 (KR) ........................ 10-2007-0048729

(51) Int. Cl.
G11B 7/00 (2006.01)
(52) U.S. Cl. ............. 369/112.1; 369/44.23; 369/112.03; 369/112.12
(58) Field of Classification Search ................... None
See application file for complete search history.

(56) References Cited

U.S. PATENT DOCUMENTS

| | | | |
|---|---|---|---|
| 5,400,311 A | 3/1995 | Komma et al. | |
| 5,446,565 A * | 8/1995 | Komma et al. | 369/112.12 |
| 5,777,973 A | 7/1998 | Yoo et al. | |
| 2005/0018560 A1 | 1/2005 | Kim et al. | |
| 2005/0180295 A1 | 8/2005 | Mimori | |
| 2005/0213472 A1 | 9/2005 | Ikenaka et al. | |
| 2005/0219987 A1 | 10/2005 | Hashimura et al. | |

FOREIGN PATENT DOCUMENTS

| | | |
|---|---|---|
| CN | 1158478 | 9/1997 |
| EP | 0 777 221 | 6/1997 |
| EP | 1 003 161 | 5/2000 |
| EP | 1 564 731 A2 | 8/2005 |
| JP | 4-212730 | 8/1992 |
| JP | 8-62493 | 3/1996 |
| JP | 2005-293765 A | 10/2005 |
| JP | 2005-310346 A | 11/2005 |

OTHER PUBLICATIONS

Extended European Search Report issued on Jul. 13, 2010, in corresponding European Patent Application No. EP 08704903.7 (6 pages).
International Search Report issued in PCT International Application No. PCT/KR2008/000381 on May 2, 2008.
Chinese Office Action issued on Feb. 23, 2011, in corresponding Chinese Application No. 200880015949.1 (7 pages).
Preliminary Notice of the First Office Action issued by the Taiwan Patent Office on Jul. 28, 2011, in counterpart Taiwan Patent Application No. 097107726 (17 pages including English translation).
decision of Rejection issued by the State Intellectual Property Office of P.R. China, in counterpart Chinese Patent Application No. 200880015949.1 (17 pages including English translation).

* cited by examiner

*Primary Examiner* — Jorge L Ortiz Criado
(74) *Attorney, Agent, or Firm* — NSIP Law

(57) ABSTRACT

A hologram optical device, and a compatible optical pickup having the hologram optical device and an information storage medium system employing the hologram optical device. The hologram optical device includes a hologram having a pattern having a period in a 4-step stairway shape. At least one of first, second, third, and fourth steps of the 4-step stairway shape is formed in a different width from at least one other step.

39 Claims, 13 Drawing Sheets

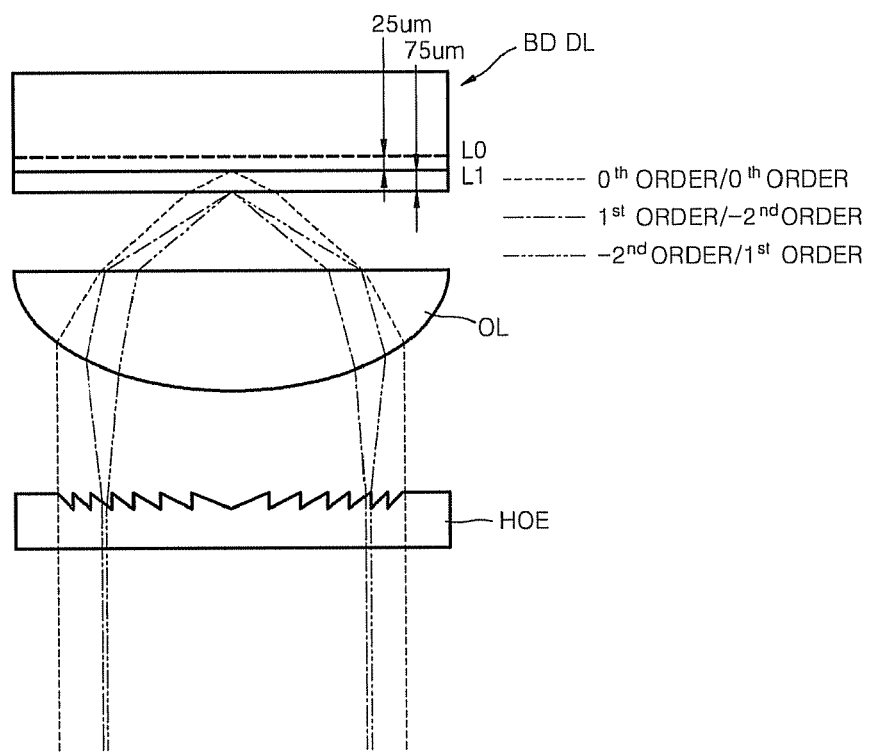

HOLOGRAM OPTICAL DEVICE, AND COMPATIBLE OPTICAL PICKUP HAVING THE HOLOGRAM OPTICAL DEVICE AND OPTICAL INFORMATION STORAGE MEDIUM SYSTEM EMPLOYING THE COMPATIBLE OPTICAL PICKUP

CROSS-REFERENCE TO RELATED APPLICATIONS

This application claims the benefit of Korean Application No. 2007-48729, filed in the Korean Intellectual Property Office on May 18, 2007, the disclosure of which is incorporated herein in by reference.

BACKGROUND OF THE INVENTION

1. Field of the Invention

The following description relates to a hologram optical device, a compatible optical pickup having the hologram optical device, and an optical information storage medium system employing the compatible optical pickup; and more particularly, to a hologram optical device for recording and/or reproducing information on or from a plurality of optical information storage media having different thicknesses by using light emitted from a light source, a compatible optical pickup having the hologram optical device, and an optical information storage medium system employing the compatible optical pickup.

2. Description of the Related Art

The recording capacity of an optical information storage medium, such as an optical disc, depends on the size of an optical spot of a laser beam focused by an objective lens in an optical information storage medium system that records and/or reproduces data on and/or from the optical disc using the optical spot. The size of the optical spot is determined according to the wavelength $\lambda$ of the laser beam and the numerical aperture (NA) of the objective lens as shown in Equation 1:

$$\text{Size of Focused Optical Spot} \propto \lambda/\text{NA} \quad (1)$$

Accordingly, a short wavelength light source, such as a blue laser beam, and an objective lens having a high NA are required to reduce the size of the optical spot focused on the optical disc so as to increase the recording density of the optical disc.

According to the Blu-ray disc (BD) standard, a single side of a BD has a storage capacity of about 25 GB. The BD standard uses a light source emitting light with a wavelength of about 405 nm and an objective lens having an NA of 0.85. The thickness (corresponding to a distance from an optical incidence surface to an information storage surface, i.e., a thickness of a protective layer) of the BD is about 0.1 mm. According to the high definition digital versatile disc (HD DVD) standard, an HD DVD has the storage capacity of about 15 GB. The HD DVD standard uses a light source emitting light with a wavelength of about 405 nm and an objective lens having an NA of 0.65. The thickness of the HD DVD is about 0.6 mm.

An apparatus is needed that can use two optical information storage media, such as a BD and a HD DVD, in one system. In one attempt to address this need, two objective lenses suitable for the two optical information storage media are used to allow the two optical information storage media to be compatible with each other. In this case, however, two objective lenses and other optical parts related to the two objective lenses must be used. Thus, the number of optical parts and the production costs are increased. In addition, it is difficult to fit an optical axis between the two objective lenses.

In order to solve these problems, a method of using only one objective lens and reducing spherical aberration using a hologram optical device may be considered. Japanese Laid-open Patent No. hei 08-062493 discloses a method of allowing a light source for a DVD to be compatible with a CD-family optical disc by using a hologram lens. In this method, a $0^{th}$-order diffraction beam is transmitted directly, so as to be focused at a focal point. A $+1^{th}$-order diffraction beam is transmitted divergently, so as to be focused at a focal point having a different focal distance from the previous focal point.

In the above disclosure, the hologram lens diffracts optical beams, which are incident in the form of parallel optical beams, into $0^{th}$-order and $+1^{th}$-order diffraction beams. The $0^{th}$-order diffraction beam is incident as a divergence-free (convergence-free) beam onto an objective lens and is used to record and/or reproduce information on and/or from a relatively thin optical disc. The $+1^{th}$-order diffraction beam is diverged and used to record and/or reproduce information on and/or from a relatively thick optical disc. An optical spot formed by the $0^{th}$-order diffraction beam is used for recording and/or reproduction with respect to a DVD. An optical spot formed by the $+1^{th}$-order diffraction beam is used for recording and/or reproduction with respect to a CD. The two optical spots are formed on the same optical axis.

As described above, a $0^{th}$-order diffraction beam is used for direct transmission and a $+1^{th}$-order diffraction beam is used for divergent transmission so as to perform recording and/or reproduction with respect to a DVD and a CD using a light source for the DVD. However, although a hologram optical device diffracts incident beams as $0^{th}$-order and $+1^{st}$-order diffraction beams, the amount of the diffraction beams having different orders is not zero. The hologram optical device substantially diffracts the incident beam in smaller amounts of different order beams.

Accordingly, a $0^{th}$-order diffraction beam reflected from an optical disc and then incident onto a hologram lens is diffracted by the hologram lens as a $0^{th}$-order diffraction beam, a $+1^{st}$-order diffraction beam, a $-1^{st}$-order diffraction beam, or the like. The $0^{th}$-order diffraction beam is used to detect a signal reproduced from a DVD. The $0^{th}$-order/$0^{th}$-order diffraction beam is used as a signal beam to perform reproduction with respect to the DVD.

Similarly, a $+1^{th}$-order diffraction beam reflected from the optical disc and then incident onto the hologram lens is diffracted by the hologram lens as a $0^{th}$-order diffraction beam, a $+1^{th}$-order diffraction beam, a $-1^{th}$-order diffraction beam, or the like. The $+1^{th}$-order diffraction beam is used to detect a signal reproduced from a CD. The $+1^{st}$-order/$1^{st}$-order diffraction beam is used as a signal beam to perform reproduction with respect to the CD.

A signal beam to perform reproduction with respect to a DVD uses $0^{th}$-order diffraction beam as an incident beam and a $0^{th}$-order diffraction beam generated by being reflected from an optical disc and then incident onto a hologram lens. A signal beam to perform reproduction with respect to a CD uses a $+1^{st}$-order diffraction beam as an incident beam and a $+1^{st}$-order diffraction beam generated by being reflected from an optical disc and then incident onto a hologram lens.

If these diffraction beams are used to perform reproduction with respect to a BD and a HD DVD, a $0^{th}$-order/$0^{th}$-order diffraction beam may be used as a signal beam for reproduction with respect to the BD, and the $1^{st}$-order/$1^{st}$-order diffraction beam may be used as a signal beam for reproduction with respect to the HD DVD. However, when an incident $n^{th}$-order diffraction beam/return beam of $n^{th}$-order diffraction beam is used as a signal beam by a hologram optical device, an incident beam of $n-1^{th}$-order diffraction beam/return beam of $n+1^{th}$-order diffraction beam and an incident beam of $n+1^{th}$-order diffraction beam/return beam of $n-1^{th}$-order diffraction beam are also incident onto a photodetector (PD) and thus operate as noise affecting the signal beam. The incident beam is a beam diffracted by the hologram optical device and then radiated onto an optical disc. The reflected beam is a beam reflected from the optical disc, incident onto and diffracted by the hologram optical device, and further proceeding toward the PD.

FIGS. 1A and 1B show optical paths of beams of different diffraction orders diffracted by a hologram optical element (HOE). FIG. 1A shows optical paths of diffracted beams of different diffraction orders in the case of a BD. FIG. 1B shows optical paths of diffracted beams in the case of an HD DVD. In FIGS. 1A and 1B, OL denotes an objective lens.

As shown in FIG. 1A, a parallel beam collimated by a light source is incident onto the HOE. A $0^{th}$-order diffraction beam incident from the HOE is reflected from a BD and then is incident onto the HOE through the $0^{th}$-order diffraction beam path. The $0^{th}$-order diffraction beam advances as a parallel beam after passing through the HOE. A $1^{st}$-order diffraction beam incident from the HOE is reflected from the BD and then is incident onto the HOE through a $-1^{st}$-order diffraction beam path. The $-1^{st}$-order diffraction beam is incident onto the HOE and then advances as a parallel beam after passing through the HOE. A $-1^{st}$-order diffraction beam incident from the HOE is reflected from the BD and then is incident onto the HOE through a $1^{st}$-order diffraction beam path. This beam advances as a parallel beam after passing through the HOE.

Accordingly, when the BD is used, the $0^{th}$-order/$0^{th}$-order diffraction beam, the $-1^{st}$-order/$1^{st}$-order diffraction beam, and the $1^{st}$-order/$-1^{st}$-order diffraction beam advance through the same optical path after passing through the HOE. Thus, when the $0^{th}$-order/$0^{th}$-order diffraction beam is used as a signal beam for reproduction with respect to the BD, the $-1^{st}$-order/$1^{st}$-order diffraction beam and the $1^{st}$-order/$-1^{st}$-order diffraction beam operate as noise and interfere with the reproduction of data stored on the BD.

Similarly, as shown in FIG. 1B, when a $1^{st}$-order/$1^{st}$-order diffraction beam is used as a signal beam for reproduction with respect to the HD DVD, a $0^{th}$-order/$2^{nd}$-order diffraction beam and a $2^{nd}$-order/$0^{th}$-order diffraction beam operate as noise.

The noise is created because a size of a spot formed on a PD by the $-1^{st}$-order/$1^{st}$-order diffraction beam and the $1^{st}$-order/$-1^{st}$-order diffraction beam with respect to the BD and the $0^{th}$-order/$2^{nd}$-order diffraction beam and the $2^{nd}$-order/$0^{th}$-order diffraction beam with respect to the HD DVD is a similar level according to a size of a spot formed by signal beam. The noise is a main factor in the deterioration of a reproduced signal. The efficiency of diffraction beams generating noise needs to be reduced to reduce noise and to increase the qualities of signals reproduced from the BD and the HD DVD.

When reproduction is performed with respect to a BD having a rewritable dual layer structure, i.e., a BD DL RE (hereinafter referred to as a BD DL), there is flowed noise due to a $+1^{st}$-order/$-2^{nd}$-order diffraction beam, a $-2^{nd}$-order/$+1^{st}$-order diffraction beam or a $-2^{nd}$-order/$0^{th}$-order diffraction beam, and a $0^{th}$-order/$-2^{nd}$-order diffraction beam reflected from a surface of the BD. When reproduction is performed with respect to a BD DL, there may be flowed noise due to diffraction beams of different diffraction orders and noise due to beams reflected from the surface of the BD DL.

FIGS. 2A and 2B show optical paths of beams of different diffraction orders diffracted by a HOE when reproduction is performed with respect to a BD DL. FIG. 2A shows optical paths of diffraction beams when reproduction is performed with respect to a layer L1 of a BD DL. FIG. 2B shows optical paths of diffraction beams when reproduction is performed with respect to a layer L0 of the BD DL. In FIGS. 2A and 2B, a layer L1 is positioned at a distance of 75 μm from a surface of the BD DL, and the layer L0 is positioned at a distance of 25 μm from the layer L1.

As shown in FIG. 2A, when an optical spot is formed by a $0^{th}$-order diffraction beam at a distance of about 150 μm from an optical spot formed by a $+1^{st}$-order diffraction beam in the BD DL, noise due to a $+1^{st}$-order/$-2^{nd}$-order diffraction beam and a $-2^{nd}$-order/$+1^{st}$-order diffraction beam reflected from a surface of the BD DL is flowed during reproduction with respect to the layer L1.

A $+1^{st}$-order diffraction beam incident from the HOE is reflected from a surface of the BD DL and then is incident onto the HOE through a $-2^{nd}$-order diffraction beam path. Thus, a $-2^{nd}$-order diffraction beam is incident onto the HOE and then advances as a parallel beam. A $-2^{nd}$-order diffraction beam incident from the HOE is reflected from the surface of the BD DL and then is incident onto the HOE through a $+1^{st}$-order diffraction beam path. Thus, a $+1^{st}$-order diffraction beam is incident onto the HOE and then advances as a parallel beam.

Accordingly, the $+1^{st}$-order/$-2^{nd}$-order diffraction beam and the $-2^{nd}$-order/$+1^{st}$-order diffraction beam advance along the same optical path as the $0^{th}$-order/$0^{th}$-order diffraction beam after passing through the HOE. Thus, the $+1^{st}$-order/$-2^{nd}$-order diffraction beam and the $-2^{nd}$-order/$+1^{st}$-order diffraction beam reflected from the surface of the BD DL is flowed as noise when reproduction is performed with respect to the layer L1.

As shown in FIG. 2B, when an optical spot is formed by a $0^{th}$-order diffraction beam at a distance of about 100 μm from an optical spot formed by a $1^{st}$-order diffraction beam in the BD DL, noise due to a $0^{th}$-order/$-2^{nd}$-order diffraction beam and a $-2^{nd}$-order/$0^{th}$-order diffraction beam reflected from a surface of the BD DL is flowed during reproduction with respect to the layer L0, resulting in the deterioration of the quality of a reproduced signal.

Therefore, the efficiency of diffraction beams generating noise must be reduced in order to improve the qualities of signals reproduced from a BD and a HD DVD. Noise reflected from a surface of a BD DL must also be reduced in order to improve the quality of a signal reproduced from the BD DL when reproduction is performed with respect to the BD DL.

SUMMARY OF THE INVENTION

General aspects described herein provide a hologram optical device capable of reducing an inflow of noise generated by unnecessary diffraction beams when an incident beam of 0th-order/return beam of 0th-order diffraction beam is used as a signal beam for a Blu-ray disc (BD) and an incident beam of 1st-order/return beam of 1st-order diffraction beam is used as a signal beam for a high definition digital versatile disc (HD DVD), so as to improve a signal-to-noise ratio (SNR) of an information reproduction signal, a compatible optical pickup having the hologram optical device, and an optical information storage medium system employing the compatible optical pickup.

According to one general aspect, a hologram optical device is provided. The hologram optical device includes a hologram having a pattern having a period in a 4-step stairway shape, wherein at least one of first, second, third, and fourth steps of the 4-step stairway shape has a different width from at least one other step.

According to another aspect, a compatible optical pickup is provided. The compatible optical pickup uses both a first optical information storage medium of a first standard and a second optical information storage medium of a second standard, the second optical information storage medium having a different thickness from the first optical information storage medium. The compatible optical pickup includes a light source to emit a beam having a predetermined wavelength; an objective lens to focus an incident beam onto an optical information storage medium; and a hologram optical device to diffract the beam incident from the light source as 0th-order and 1st-order diffraction beam. The hologram optical device includes a hologram having a pattern having a period in a 4-step stairway shape, wherein at least one of first, second, third, and fourth steps of the 4-step stairway shape has a different width from at least one other step.

According to another aspect of the invention, the widths of the first and fourth steps are equal and the widths of the second and third steps are equal to but different from the widths of the first and fourth steps.

According to another aspect of the invention, the hologram is formed so that the widths of the first and fourth steps are equal to each other and equal to or greater than 0.16T and less than 0.25T, and the widths of the second and third steps are equal to each other and each equal to 0.5T—the width of the first step, where T is a width of the period of the pattern.

According to another aspect of the invention, the hologram is formed so that a phase variation determined by a step difference between the first and second steps is equal to a phase variation determined by a step difference between the second and third steps and is equal to a phase variation determined by a step difference between the third and fourth steps.

According to another aspect of the invention, the hologram optical device includes a first area formed in the hologram to diverge a $1^{st}$-order diffraction beam.

According to another aspect of the invention, the hologram optical device further includes a second area including a hologram formed outside the first area to diffract the incident beam as a $0^{th}$-order diffraction beam and a convergent $1^{st}$-order diffraction beam.

According to another aspect of the invention, a step-shaped hologram is formed in the second area so that a direction of steps in the step-shaped hologram is symmetrical to that of the steps of the hologram formed in the first area.

According to another aspect of the invention, the second area is formed so that a diffraction efficiency of the $0^{th}$-order diffraction beam is approximate to or greater than a diffraction efficiency of the $1^{st}$-order diffraction beam.

According to another aspect of the invention, the first area may be formed so that the diffraction efficiency of the $0^{th}$-order diffraction beam is approximate to the diffraction efficiency of the $1^{st}$-order diffraction beam.

According to another aspect of the invention, t thickness of the first optical information storage medium is 0.1 mm, and a thickness of the second optical information storage medium is 0.6 mm.

According to another aspect of the invention, the first optical information storage medium is in accordance with the Blu-ray disc (BD) standard, and the second optical information storage medium is in accordance with the high definition digital versatile disc (HD DVD) standard.

According to another aspect of the invention, the light source emits a blue beam having a wavelength between 400 nm and 420 nm.

According to another aspect of the invention, the objective lens has a first numerical aperture (NA) suitable for the first optical information storage medium of the first standard, and the first area of the hologram optical device may be formed so that an outmost diameter of the first area forms a second NA suitable for the second optical information storage medium of the second standard when the hologram optical device is combined with the objective lens.

According to another aspect of the invention, the first NA is 0.85 and the second NA is 0.65.

According to another general aspect, an optical information storage medium system is provided. The optical information storage medium system includes a compatible optical pickup to record and/or reproduce data to/from both a first optical information storage medium of a first standard and a second optical information storage medium of a second standard, the second optical information storage medium having a different thickness from the first optical information storage medium; and a controller to control the compatible optical pickup. The compatible optical pickup has at least one of the above-described characteristics.

Additional aspects and/or features may be apparent from the following detailed description, the drawings, and the claims.

BRIEF DESCRIPTION OF THE DRAWINGS

FIGS. 2A and 2B illustrate examples of optical paths of beams of different diffraction orders diffracted by a HOE when reproduction is performed with respect to layers L1 and L0 of a BD DL.

with respect to variations in $\Phi_2$.

Figure 9:
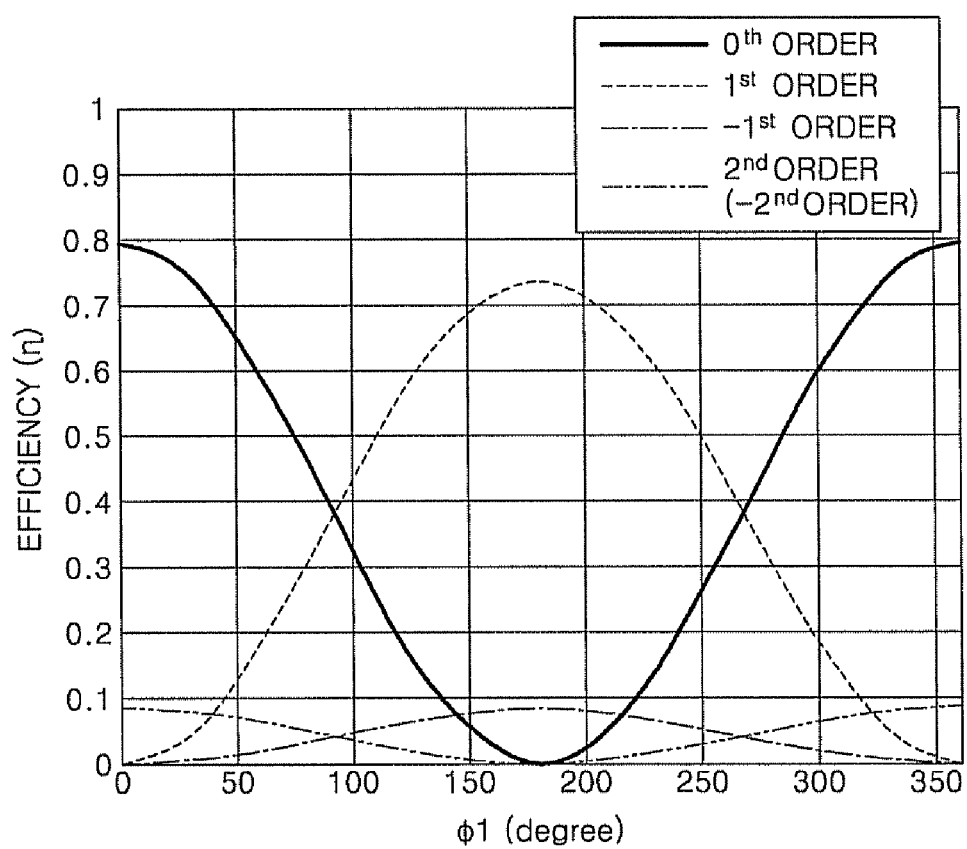

FIG. 9 is a graph illustrating examples of variations in efficiencies of $0^{th}$-order, $1^{st}$-order, $-1^{st}$-order, $2^{nd}$-order, and $-2^{nd}$-order diffraction beams according to $\Phi_1$ when $\Phi_2=54.05°$.

Figure 10:
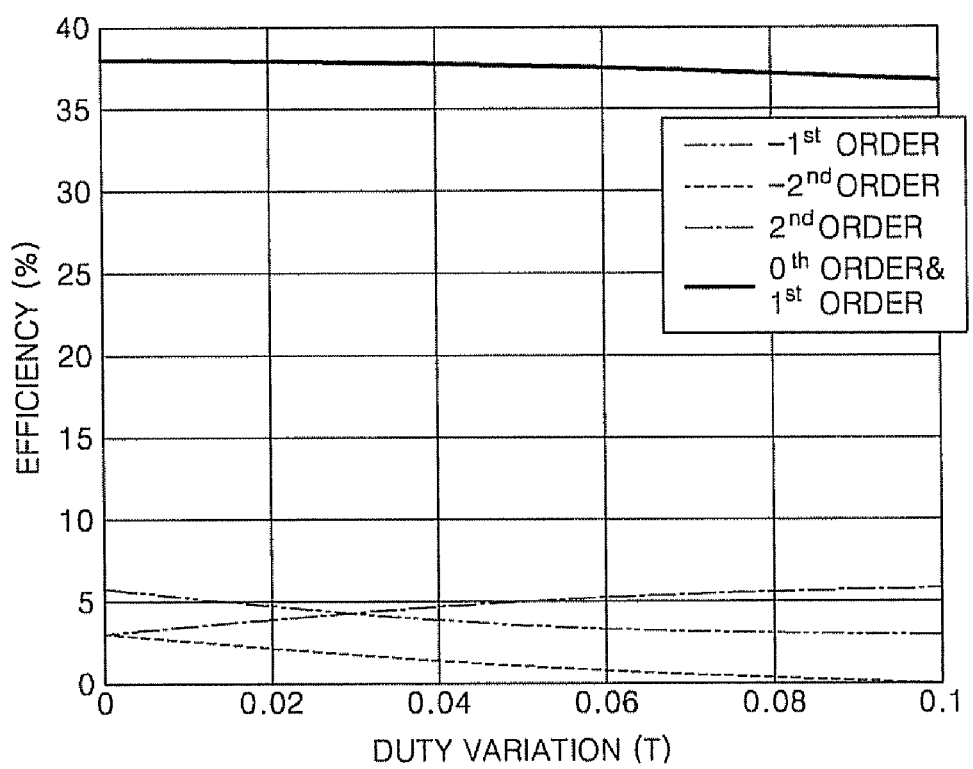

FIG. 10 is a graph illustrating examples of efficiencies of $-1^{st}$-order, $-2^{nd}$-order, and $2^{nd}$-order diffraction beams with respect to duty variations when $\eta_0 = \eta_1$.

Figure 11:
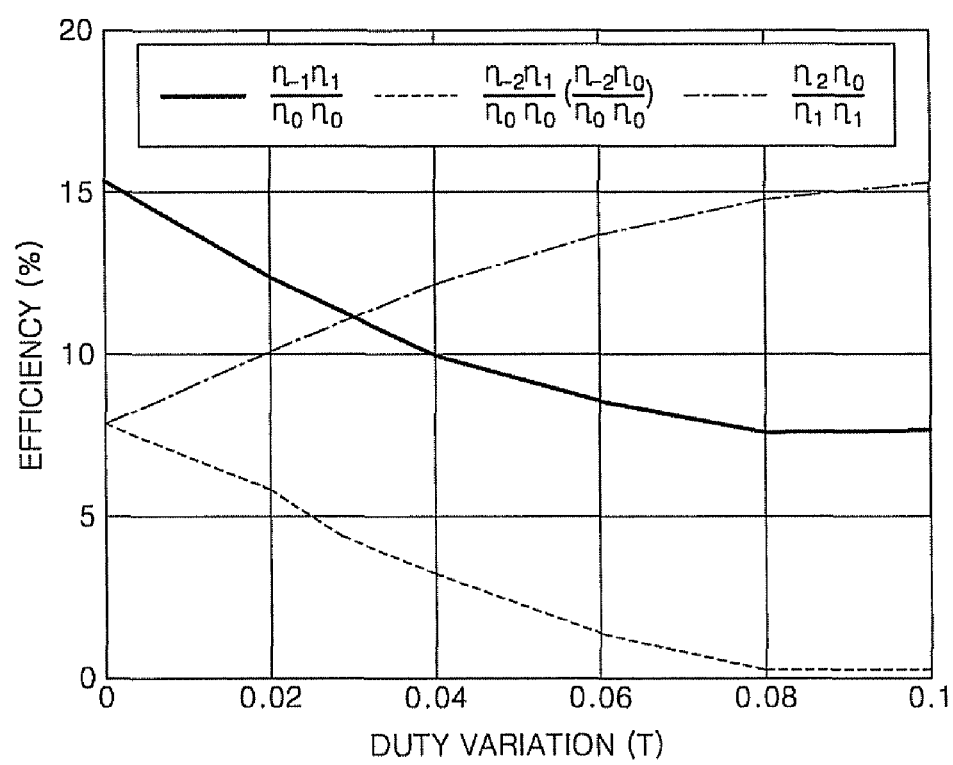

FIG. 11 is a graph illustrating examples of ratios of $$\frac{\eta_{-1}\eta_1}{\eta_0\eta_0}, \frac{\eta_2\eta_0}{\eta_1\eta_1}, \text{ and } \frac{\eta_{-2}\eta_1}{\eta_0\eta_0}\left(\frac{\eta_{-2}\eta_0}{\eta_0\eta_0}\right)$$

with respect to duty variations when $\eta_0 = \eta_1$.

Figure 12:
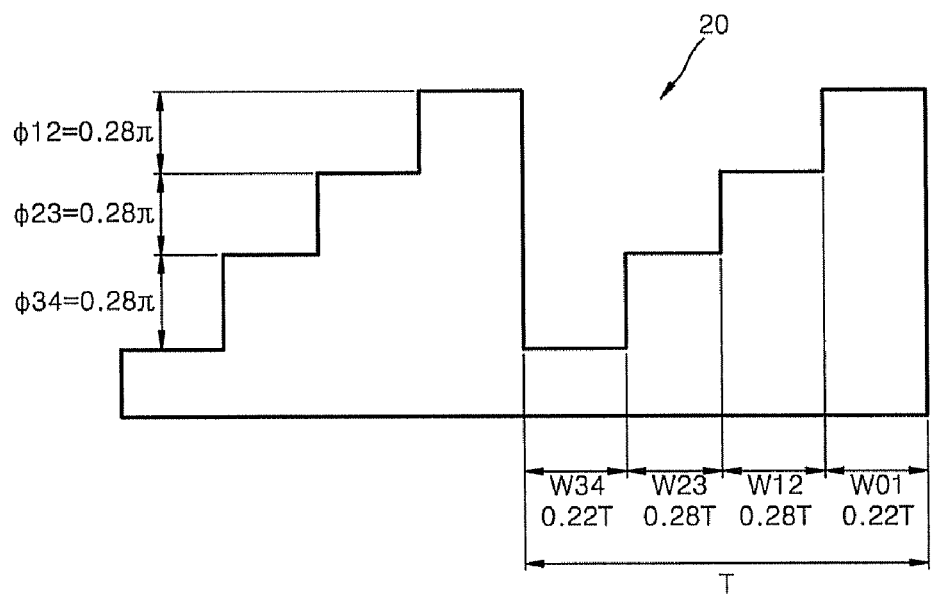

FIG. 12 illustrates examples hologram patterns of a hologram optical device.

Figure 13:
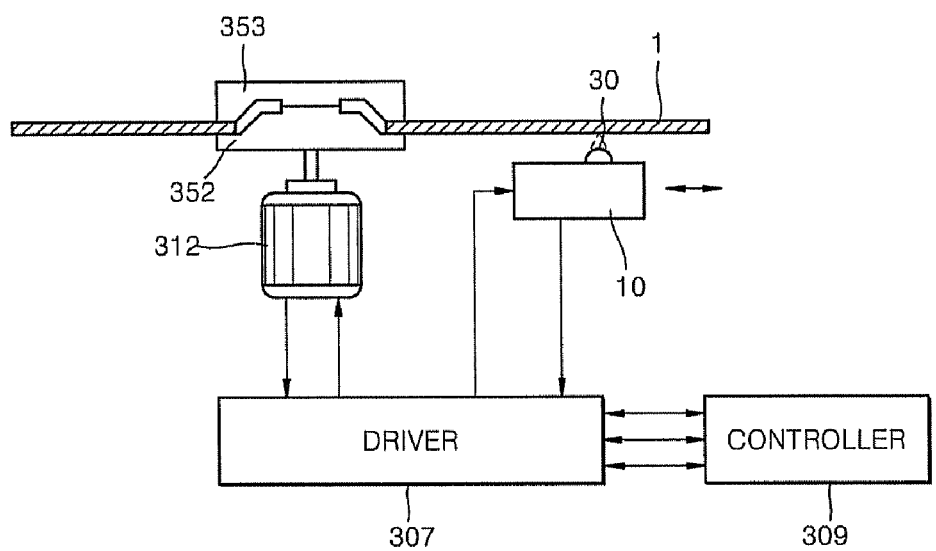

FIG. 13 schematically illustrates an example of an optical information storage medium system employing a compatible optical pickup.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Figure 1A:
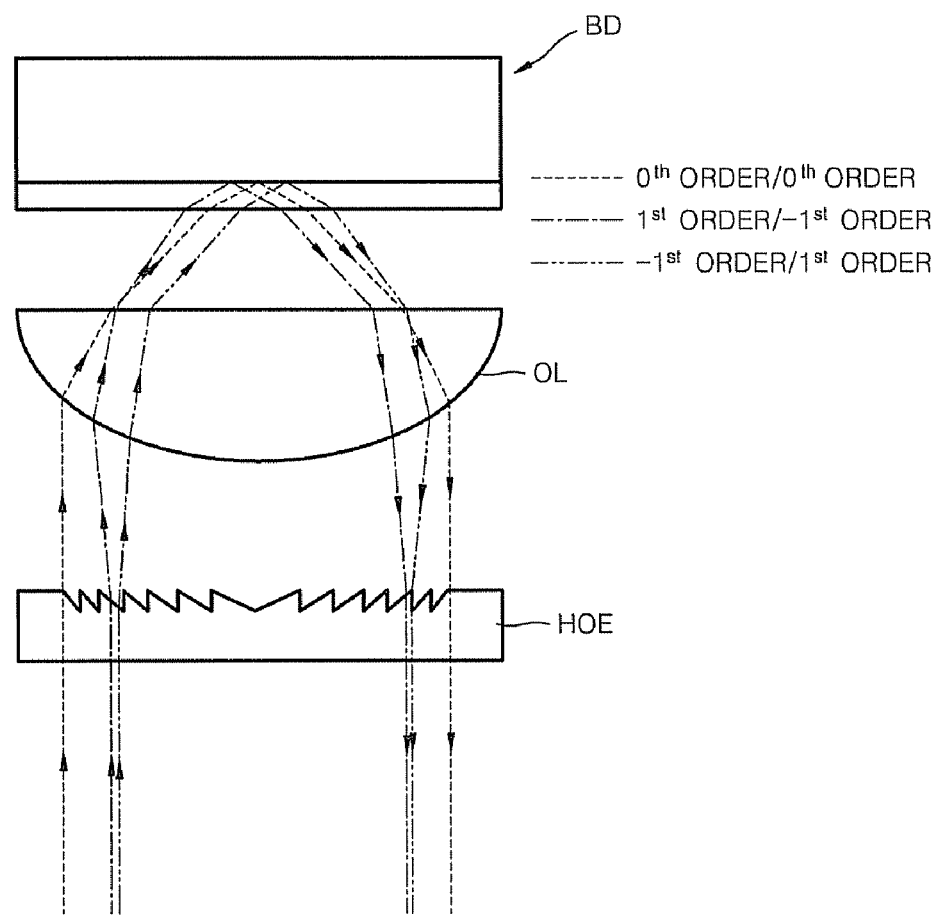
FIGS. 1A and 1B illustrate examples of optical paths of beams of different diffraction orders diffracted by a hologram optical element (HOE) in the case of a Blu-ray disc (BD) and a high definition digital versatile disc (HD DVD).
Figure 1B:
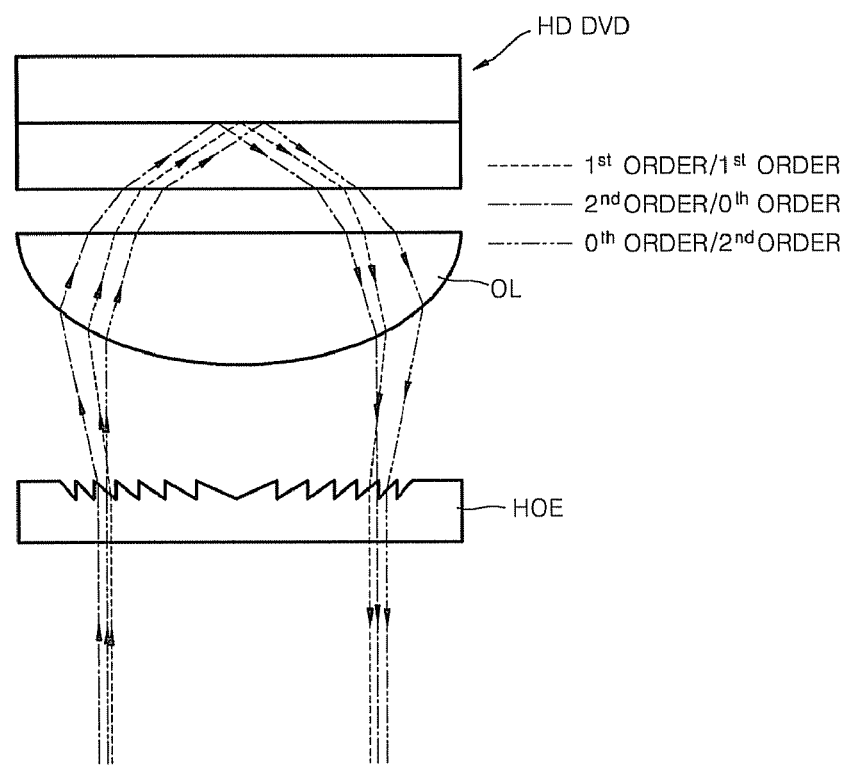
Figure 2B:
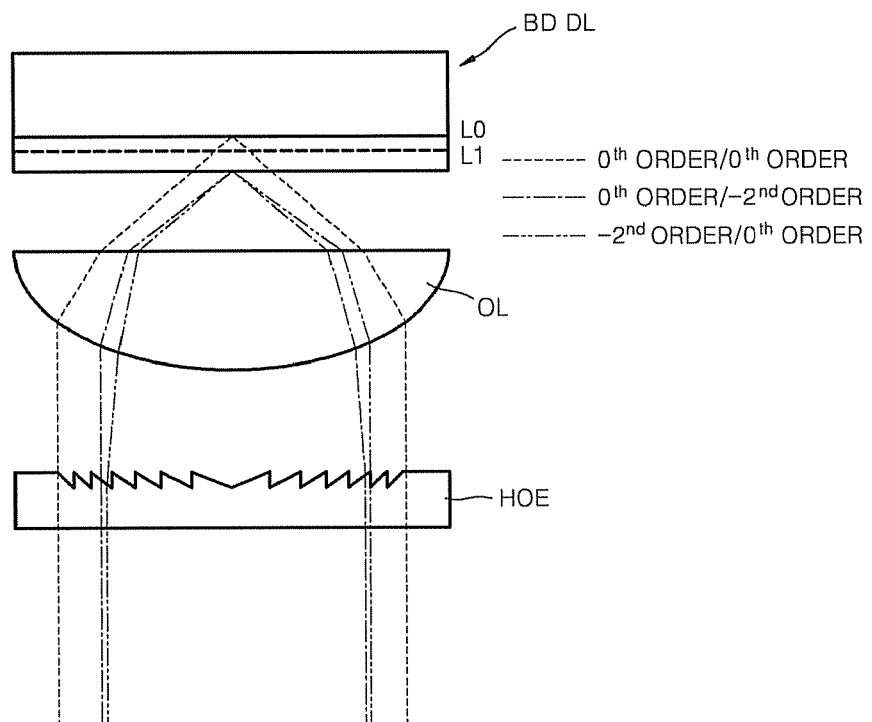
Figure 3:
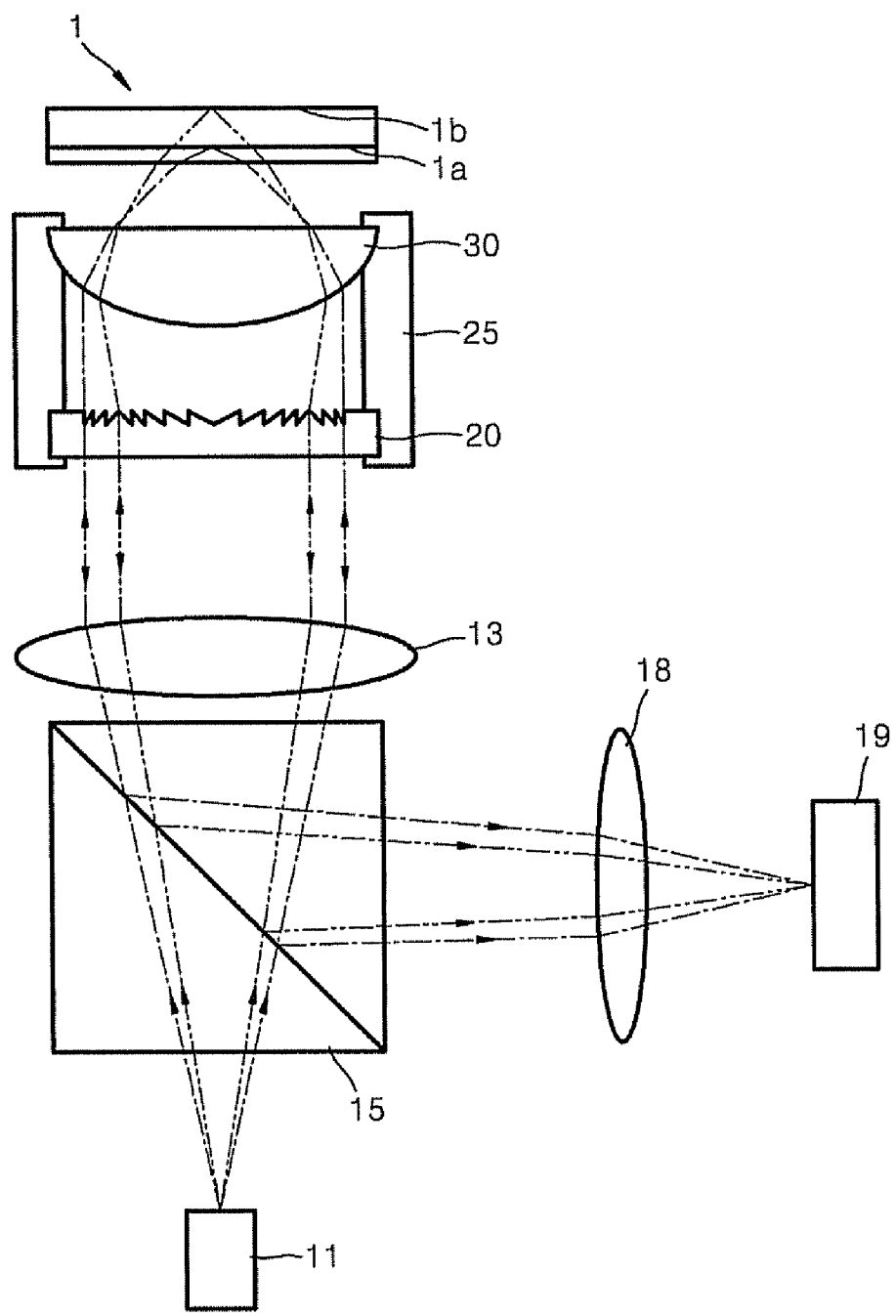
FIG. 3 schematically illustrates an example of a compatible optical pickup employing a hologram optical device.

FIG. 3 shows an example of a compatible optical pickup 10 employing a hologram optical device. The compatible optical pickup 10 may use both a first optical information storage medium 1a of a first standard and a second optical information storage medium 1b of a second standard. The compatible optical pickup 10 includes a light source 11, an objective lens 30, an optical path changer 15, a photodiode (PD) 19, and a hologram optical device 20. The light source 11 emits beam having predetermined wavelength. According to other aspects, the compatible optical pickup 10 may include additional and/or different components. Similarly, the functionality of two or more of the above components may be combined into a single unit.

The objective lens 30 focuses an incident beam onto an optical information storage medium 1. The optical path changer 15 is disposed on an optical path between the light source 11 and the objective lens 30 to change the advancing path of the incident beam. The PD 19 receives the incident beam, which is reflected from the optical information storage medium 1, via the objective lens 30 and the optical path changer 15. The hologram optical device 20 diffracts the beams incident from the light source 11 as a $0^{th}$-order diffraction beam that is directly transmitted and a $1^{st}$-order diffraction beam that is divergently transmitted.

The first and second optical information media 1a and 1b correspond to standards defining optical discs having different thicknesses and using a beam having the same wavelength. The first optical information storage medium 1a may correspond to the Blu-ray disc (BD) standard. The second optical information storage medium 1b may correspond to the high definition digital versatile disc (HD DVD) standard. A thickness of the first optical information storage medium 1a may be about 0.1 mm. A thickness of the second optical information storage medium may be about 0.6 mm. Examples of the first optical information storage medium 1a of the first standard and the second optical information storage medium 1b of the second standard are described as a BD and a HD DVD, respectively. However, the first and second optical information storage media according to other aspects of the invention may also conform to different standards and have thicknesses corresponding to these different standards.

The light source 11 emits a beam of a wavelength commonly used for the BD 1a and the HD DVD 1b. For example, the light source 11 may emit a blue beam having a wavelength between 400 nm and 420 nm, such as about 405 nm. The light source 11 may be a semiconductor laser that emits a blue laser beam.

The objective lens 30 focuses the incident beam onto the optical information storage medium 1. The objective lens 30 may be also provided to be suitable for the BD 1a and thus may have a first numerical aperture (NA), such as an NA of 0.85.

When the BD 1a is used, a $0^{th}$-order diffraction beam passes straight through first and second areas 21 and 23 of the hologram optical device 20, which will be described later with respect to FIG. 4, and then is focused onto the BD 1a by the objective lens 30. When the HD DVD 1b is used, a $1^{st}$-order diffraction beam is diffracted in the first area 21 of the hologram optical device 20 and then focused onto the HD DVD 1b by the objective lens 30.

A collimating lens 13 may be further included on the optical path between the light source 11 and the objective lens 30 so as to collimate divergent beams emitted from the light source 11 as parallel beam. As shown in FIG. 3, the collimating lens 13 is disposed between the optical path changer 15 and the hologram optical device 20. A detection lens 18 may be further included on an optical path between the optical path changer 15 and the PD 19 so as to focus the beam reflected from the optical information storage medium 1 with an optical spot having an appropriate size onto the PD 19. The detection lens 18 may be an astigmatic lens so as to detect a focus error signal using an astigmatic method. The optical path changer 15 may include a general beam splitter. Alternatively, the optical path changer 15 may include a polarization beam splitter (PBS) and a quarter wave plate.

The compatible optical pickup 10 may further include a grating (not shown) to detect a tracking servo signal using a 3-beam method or differential push pull (DPP). The grating may be disposed on an optical path between the light source 11 and the optical path changer 15 so as to split a beam incident from the light source 11 into three beams, i.e., a main beam and two sub beams. In this case, the PD 19 may include a main light-receiving area receiving the main beam and first and second sub light-receiving areas respectively receiving the two sub beams. For example, the main light-receiving area may have four light-receiving areas. The sub light-receiving areas may have two light-receiving areas. In this case, the tracking servo signal may be detected using DPP or the 3-beam method. When the compatible optical pickup 10 detects the tracking servo signal using the 3-beam method, the first and second light-receiving areas may have a single light-receiving area. The detailed structures of the grating and the PD 19 used for detecting the tracking servo signal when the 3-beam method or DPP is used are well known in the art, and thus their illustrations will be omitted.

The hologram optical device 20 diffracts the beam incident from the light source as the $0^{th}$-order and $1^{st}$-order diffraction beams. The $0^{th}$-order diffraction beam is used to perform recording and/or reproduction with respect to the BD 1a. The $1^{st}$-order diffraction beam is used to perform recording and/or reproduction with respect to the HD DVD 1b. The hologram optical device 20 is fixed by a support member 25 so as to keep a predetermined distance from the objective lens 30.

Figure 4:
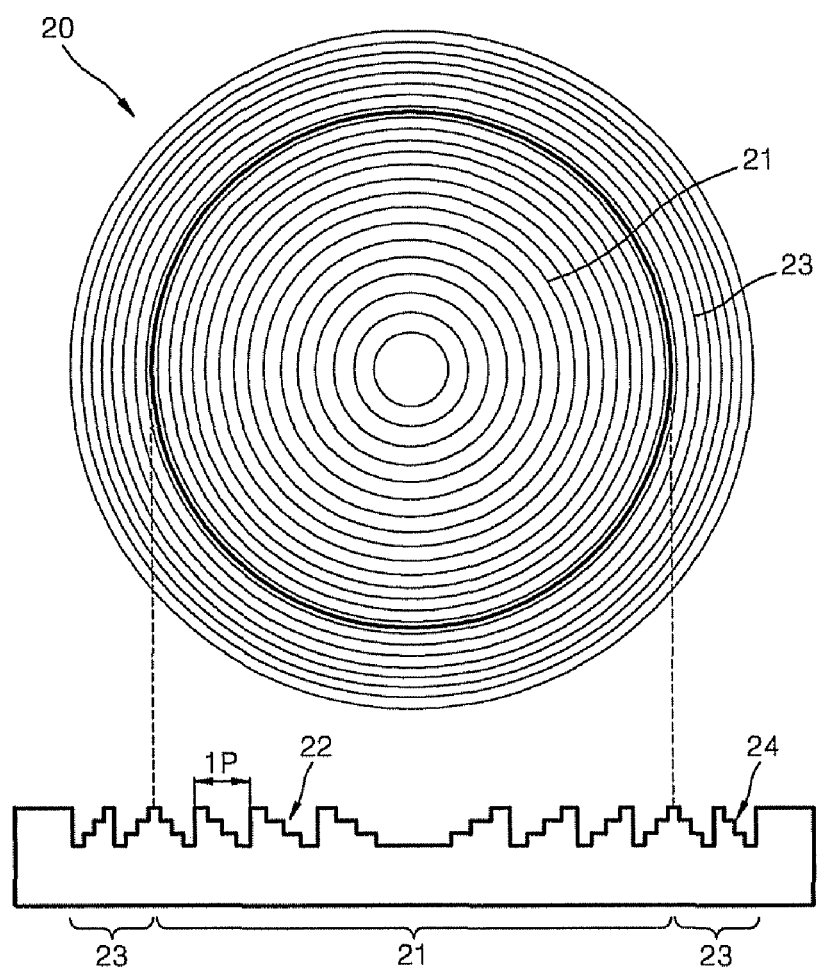
FIG. 4 illustrates an example of a hologram optical device.

FIG. 4 illustrates an example of the hologram optical device 20. As shown in FIG. 4, when an incident beam of 0th-order diffraction beam/return beam of 0th-order diffraction beam is used as a signal beam for the BD 1a and an incident beam of 1st-order/return beam of 1st-order diffraction beam is used as a signal beam for the HD DVD 1b, a hologram 22 is formed in the hologram optical device 20 to reduce an inflow of noise generated by other diffraction beams. A cross-section of a hologram pattern of a period 1P of the hologram 22 is formed in a 4-step stairway shape, and at least one of first through fourth steps of the 4-step stairway shape has a different width from the other steps.

The hologram optical device 20 includes the first area 21 in which the hologram 22 having the 4-step stairway shape is formed. The hologram 22 in the first area 21 is formed so as to transmit a $0^{th}$-order diffraction beam directly and to diverge a $1^{st}$-order diffraction beam. The hologram 22 in the first area 21 may be formed so that the diffraction efficiency of the $0^{th}$-order diffraction beam is approximate to that of the $1^{st}$-order diffraction beam. The approximation between the diffraction efficiencies includes a possibility that the diffraction efficiencies are the same. The hologram 22 in the first area 21 is formed in a step-shaped hologram pattern on the same axis so as to operate as a hologram lens that diverges the $1^{st}$-order diffraction beam.

When the objective lens 30 has a first NA suitable for the BD 1a, e.g., an NA of 0.85, a size of the first area 21 may be determined to have a second NA suitable for the HD DVD 1b, e.g., a NA of 0.65, when the first area 21 is combined with the objective lens 30. The hologram 22 formed in the first area 21 will be described in more detail later.

The hologram optical device 20 may further include a second area 23 that is formed outside the first area 21 and in which holograms 24 are formed to diffract incident beam as an incident $0^{th}$-order diffraction beam and a convergent $1^{st}$-order diffraction beam. The hologram 24 in the second area 23 may be formed in a step-shaped hologram pattern on the same axis so as to operate as a hologram lens that converges the $1^{st}$-order diffraction beam. The holograms 24 may be formed in the second area 23 in a step shape symmetrical to a step shape of the hologram 22 formed in the first area 21 so as to prevent a $+1^{st}$-order diffraction beam from being focused onto the HD DVD 1b. The $0^{th}$-order diffraction beam diffracted by the holograms 24 in the second area 23 is used as an effective beam for the BD 1a, while the $1^{st}$-order diffraction beam is not focused onto an information storage surface of the HD DVD 1b and thus is not used as an effective beam for the BD.

A size of the second area 23 may be determined by the first NA suitable for the BD 1a, e.g., the NA of 0.85. The holograms 24 in the second area 23 may be formed so that the diffraction efficiency of the $0^{th}$-order diffraction beam is approximate to or greater than that of the $1^{st}$-order diffraction beam. The approximation between the diffraction efficiencies includes a possibility that the diffraction efficiencies are the same.

The holograms 24 in the second area 23 may be substantially formed in the same step shape as the hologram 22 in the first area 21. However, the step shape of the holograms 24 may be symmetrical to that of the hologram 22.

As shown in FIGS. 3 and 4, the hologram 22 and 24 are respectively formed in the first and second areas 21 and 23 of the hologram optical device 20. However, the examples described herein are not limited thereto. The hologram optical device 20 may have a structure in which the hologram 22 is formed in the first area 21 but the hologram 24 is not formed in the second area 23.

Figure 5:
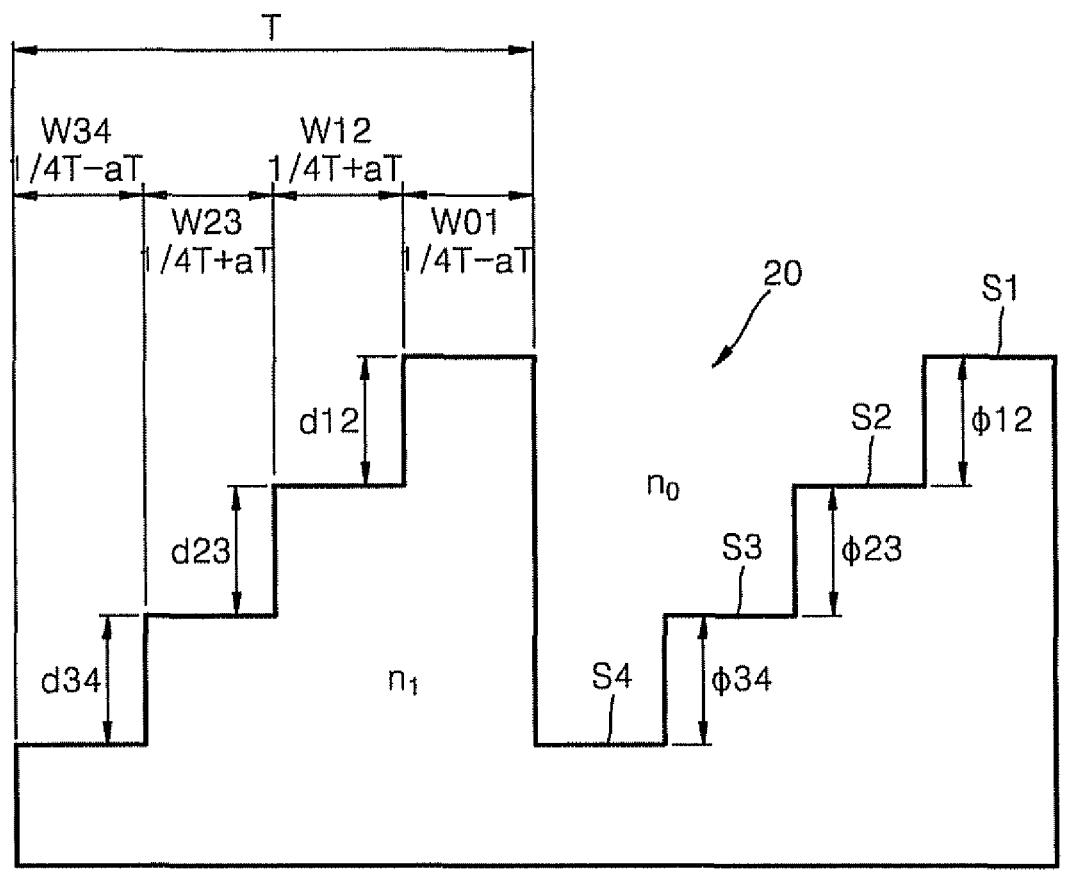
FIG. 5 is an enlarged cross-sectional view illustrating examples of hologram patterns formed in a first area of the hologram optical device illustrated in FIG. 4.

FIG. 5 is an enlarged cross-sectional view showing examples of hologram patterns formed in the first area 21 of the hologram optical device 20 of FIG. 4. As previously described, a hologram pattern may also be formed in the second area 23 of the hologram optical device 20. As shown in FIG. 5, a cross-section of a hologram pattern of the hologram optical device 20 with a period 1P may have a 4-step stairway shape. At least one of first, second, third, and fourth steps S1, S2, S3, and S4 of the 4-step stairway shape has a different width from the other steps.

A conventional hologram optical device disclosed in Japanese Laid-open Patent No. 1992-212730 is now compared with the hologram optical device 20. In the conventional hologram optical device, the widths of steps are the same, but the heights of step differences of the steps are different so as to change phases of the steps. Thus, the incident beam is mainly diffracted as $0^{th}$-order and $1^{st}$-order diffraction beams. By contrast, in the hologram optical device 20, the widths of steps are adjusted to mainly diffract incident beams as $0^{th}$-order and $1^{st}$ order diffraction beams and suppress the diffraction efficiencies of $-1^{st}$-order, $2^{nd}$-order, and $-2^{nd}$-order diffraction beams. Thus, an inflow of noise generated by unnecessary diffraction beams is reduced.

According to a general aspect, the widths of the first and fourth steps S1 and S4 may be equal to each another, and the widths of the second and third steps S2 and S3 may be equal to each other.

As shown in FIG. 5, the total width of the hologram pattern with the period 1P having the 4-step stairway shape is T, and the widths of the first, second, third, and fourth steps S1, S2, S3, and S4 are W01, W12, W23, and W34, respectively. The widths W01 and W34 of the first and fourth steps S1 and S4 may each be "¼T−aT," and the widths W12 and W23 of the second and third steps S2 and S3 may each be "¼T+aT", where "a" denotes a number having an absolute value smaller than "1" and is expressed with duty variations.

For example, the hologram pattern of the hologram optical device 20 may be formed so as to satisfy conditions that the widths W01 and W34 of the first and fourth steps S1 and S4 are equal to each other and each equal to or greater than 0.16T and less than 0.25T, and the widths W12 and W23 of the second and third steps S2 and S3 are equal to each other and each equal to "0.5T−W01."

As shown in FIG. 5, a step difference between the first and second steps S1 and S2 is d12, a step difference between the second and third steps S2 and S3 is d23, a step difference between the third and fourth steps S3 and S4 is d34, and phase variations of beam determined by the step differences d12, d23, and d34 are φ12, φ23, φ34, respectively. The 4-step stairway shape may be formed so that the phase variations are equal to each other, i.e., φ12=φ23=φ34. Alternatively, the 4-step stairway shape may be formed so that at least a portion of the phase variations is different from the others.

When the hologram optical device 20 uses the incident $0^{th}$-order diffraction beam/return beam of $0^{th}$-order diffraction beam as the signal beam for the BD 1a and the incident $1^{st}$-order/reflected $1^{st}$-order diffraction beam as the signal beam for the HD DVD 1b as described above, a ratio of optical power of a noise beam to optical power of the signal beam may be minimized.

A basis for minimizing the ratio of the optical power of the noise beam to the optical power of the signal beam using the hologram optical device 20 will now be described. A case where phase variations determined by step differences of a 4-step stairway are the same will be described to further clarify the characteristics of the hologram optical device 20 obtained by changing widths of four steps of the 4-step stairway.

As previously described, a ratio of optical power of a noise beam to optical power of a signal beam should be minimized in order to improve signal characteristics of a BD and a HD DVD. Since the BD uses a $0^{th}$-order diffraction beam as a signal beam and the HD DVD uses a $1^{st}$-order diffraction beam as a signal beam, the diffraction efficiencies of the $0^{th}$-order and $1^{st}$-order diffraction beams should be maximized in order to minimize a ratio of optical power of a noise beam to optical power of the signal beams, and thus improve the signal characteristics of the BD and the HD DVD. However, since the beam incident onto a hologram optical device is divided to be respectively used for the BD and the HD DVD, the diffraction efficiencies of the $0^{th}$-order and $1^{st}$-order diffraction beams should be equal to maximize both the $0^{th}$-order and $1^{st}$-order diffraction beams. In order to satisfy the above requirements so as to improve the signal characteristics of the BD and the HD DVD, the hologram optical device 20 should satisfy Equation 2:

$$BD: \text{Min}\left(\frac{\eta_{-1}\eta_1}{\eta_0\eta_0}\right), \text{Min}\left(\frac{\eta_{-2}\eta_0}{\eta_0\eta_0}\right) \text{ or } \text{Min}\left(\frac{\eta_{-2}\eta_1}{\eta_0\eta_0}\right) \quad (2)$$

$$HD \ DVD: \text{Min}\left(\frac{\eta_2\eta_0}{\eta_1\eta_1}\right)$$

$$\eta_0 = \eta_1$$

wherein $\eta_m$ (m= ... -2, -1, 0, 1, 2, ...) denotes the diffraction efficiency of each diffraction order. In other words, $\eta_0$, $\eta_1$, $\eta_{-1}$, $\eta_2$, and $\eta_{-2}$ denote $0^{th}$-order, $1^{st}$-order, $-1^{st}$-order, $2^{nd}$-order, and $-2^{nd}$-order diffraction efficiencies, respectively.

Figure 6:
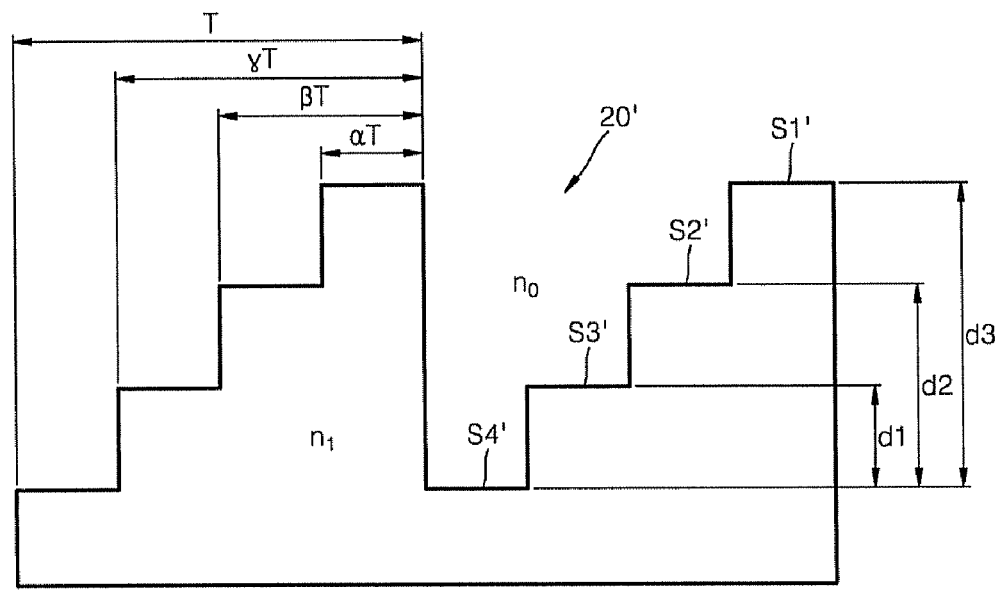
FIG. 6 is a cross-sectional view illustrating examples of hologram patterns of a general diffraction device (hologram optical device)

A general diffraction device having a pattern of a period with a 4-step stairway shape, as shown in FIG. 6, i.e., a hologram optical device 20', will now be considered. A refractive index of a medium of the hologram optical device 20' is $n_1$. A refractive index of a medium (an air gap) around the medium is $n_0$. d1 denotes a step difference between fourth and third steps S4' and S3', d2 denotes a step difference from the fourth step S4' to a second step S2', and d3 denotes a step different from the fourth step S4' to a first step S1'. When a total width of the pattern of the period is T, a width of the first step S1' is αT, a width of a sum of the first and second steps S1' and S2' is βT, and a width of a sum of the first, second, and third steps S1', S2', and S3' is γT. In this case, transmissivity $T_m$ of each diffraction order and diffraction efficiency $\eta_m$ of the each diffraction order corresponding to the square of the transmissivity $T_m$ are expressed as in Equations 3 and 4, respectively:

$$T_m = \frac{1}{T}\int_0^{\alpha T} e^{\frac{2\pi i m}{T}x} dx + \frac{1}{T}\int_{\alpha T}^{\beta T} e^{\frac{2\pi i m}{T}x} e^{\frac{2\pi i (n_1 - n_0) d_1}{\lambda}} dx + \quad (3)$$

$$\frac{1}{T}\int_{\beta T}^{\gamma T} e^{\frac{2\pi i m}{T}x} e^{\frac{2\pi i (n_1 - n_0) d_2}{\lambda}} dx +$$

$$\frac{1}{T}\int_{\gamma T}^{T} e^{\frac{2\pi i m}{T}x} e^{\frac{2\pi i (n_1 - n_0) d_3}{\lambda}} dx$$

$$\eta_m = [T_m]^2 \quad (4)$$

Figure 7:
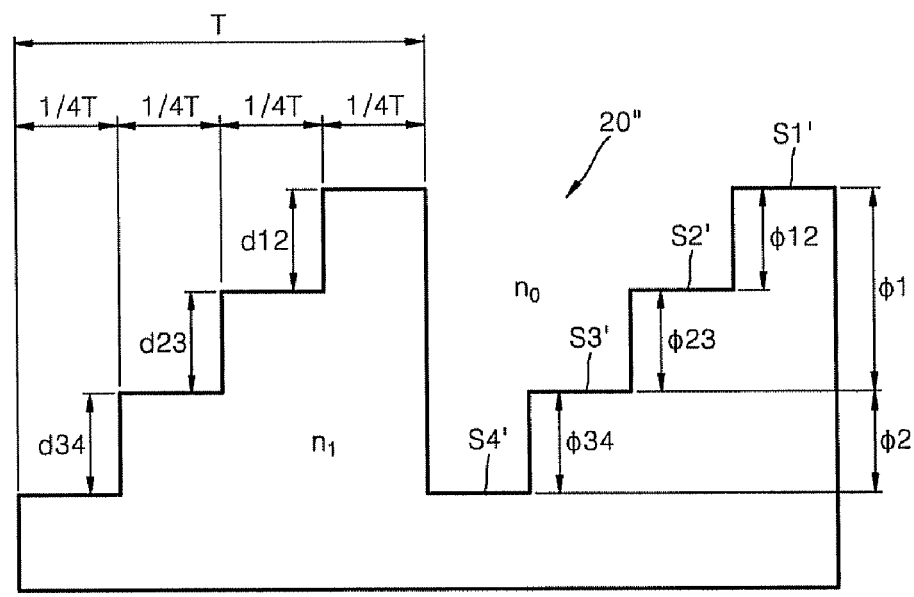
FIG. 7 illustrates a conventional hologram optical device disclosed in Japanese Laid-open Patent No. 1992-212730, corresponding to the general hologram optical device illustrated in FIG. 6.

In a conventional hologram optical device 20'', as shown in FIG. 7, the phase variations determined by the step differences of hologram pattern are changed to be the diffraction efficiency of each diffraction order. Such a conventional hologram optical device 20'' is disclosed in Japanese Laid-open Patent No. 1992-212730. As shown in FIG. 7, a total width of a pattern of a period of the hologram optical device 20' is T. First, second, third, and fourth steps S1', S2', S3', and S4' of a 4-step stairway of the conventional hologram optical device 20'' each have a width of 0.25T. A phase variation $\phi_{12}$ determined by a step difference between the first and second steps S1' and S2' is equal to a phase variation $\phi_{34}$ determined by a step difference between the third and fourth steps S3' and S4'. The diffraction efficiency is expressed as in Equation 5. When only a depth of the hologram optical device 20'' is changed, the $2^{nd}$-order diffraction efficiency is equal to the $-2^{nd}$-order diffraction efficiency.

$$\eta_{-1} = \frac{2}{\pi^2}(1 - \sin\phi_2)(1 - \cos\phi_1) \quad (5)$$

$$\eta_0 = \frac{1}{4}(1 + \cos\phi_2)(1 + \cos\phi_1)$$

$$\eta_1 = \frac{2}{\pi^2}(1 + \sin\phi_2)(1 - \cos\phi_1)$$

$$\eta_{+2} = \frac{1}{\pi^2}(1 - \cos\phi_2)(1 + \cos\phi_1)$$

$$\phi_1 = \frac{2\pi \times d_1(n_1 - n_0)}{\lambda}$$

$$\phi_2 = \frac{2\pi \times d_2(n_1 - n_0)}{\lambda}$$

Here, $\phi_1$ is a sum of the phase variation $\phi 12$ determined by the step difference between the first and second steps S1' and S2' and a phase variation $\phi_{23}$ determined by a step difference between the second and third steps S2' and S3', and $\phi_2$ corresponds to the phase variation $\phi_{34}$ determined by the step difference between the third and fourth steps S3' and S4'.

As described above, when a $0^{th}$-order/$0^{th}$-order diffraction beam is used as a signal beam during adoption of a BD, a $-1^{st}$-order/$1^{st}$-order diffraction beam and a $1^{st}$-order/$1^{st}$-order diffraction beam operate as noise. When a $1^{st}$-order/$1^{st}$-order diffraction beam is used as a signal beam during adoption of a HD DVD, a $0^{th}$-order/$2^{nd}$-order diffraction beam and a $2^{nd}$-order $0^{th}$-order diffraction beam operate as noise. A ratio of optical power of noise beams to the signal beams is obtained from Equations 2 and 5 as in Equation 6:

$$\frac{\eta_{-1}\eta_1}{\eta_0\eta_0} = \frac{\eta_{-1}}{\eta_1} = \frac{\frac{2}{\pi^2}(1 - \sin\phi_2)(1 - \cos\phi_1)}{\frac{2}{\pi^2}(1 + \sin\phi_2)(1 - \cos\phi_1)} = \frac{(1 - \sin\phi_2)}{(1 + \sin\phi_2)} \quad (6)$$

$$\frac{\eta_2\eta_0}{\eta_1\eta_1} = \frac{\eta_2}{\eta_0} = \frac{\frac{2}{\pi^2}(1 - \cos\phi_2)(1 + \cos\phi_1)}{\frac{1}{4}(1 + \cos\phi_2)(1 + \cos\phi_1)} = \frac{4 \times (1 - \sin\phi_2)}{\pi^2 \times (1 + \sin\phi_2)}$$

Here, $\frac{\eta_{-1}\eta_1}{\eta_0\eta_0}$ and $\frac{\eta_2\eta_0}{\eta_1\eta_1}$ respectively denote ratios of optical power of a $-1^{st}$-order/$1^{st}$-order diffraction beam (noise beam) to optical power of a signal beam and optical power of a $2^{nd}$-order/$0^{th}$-order diffraction beam (noise beam) to optical power of the signal beam. The conditions of the phase variation $\phi_2$ can be deduced from Equation 6.

Figure 8:
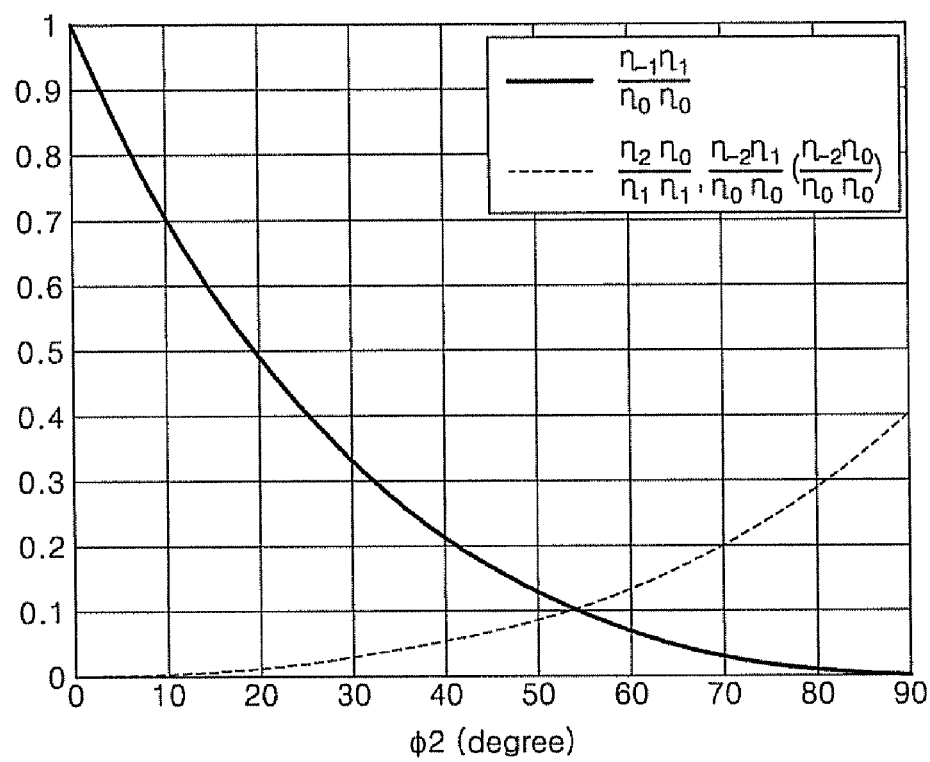
FIG. 8 is a graph illustrating examples of variations in $$\frac{\eta_{-1}\eta_1}{\eta_0\eta_0}, \frac{\eta_2\eta_0}{\eta_1\eta_1}, \text{ and } \frac{\eta_{-2}\eta_1}{\eta_0\eta_0}\left(\frac{\eta_{-2}\eta_0}{\eta_0\eta_0}\right)$$

FIG. 8 is a graph showing variations in $$\frac{\eta_{-1}\eta_1}{\eta_0\eta_0}, \frac{\eta_2\eta_0}{\eta_1\eta_1}, \text{ and } \frac{\eta_{-2}\eta_1}{\eta_0\eta_0}\left(\frac{\eta_{-2}\eta_0}{\eta_0\eta_0}\right)$$

with respect to the phase variation $\phi_2$. Here, $$\frac{\eta_{-2}\eta_1}{\eta_0\eta_0}\left(\frac{\eta_{-2}\eta_0}{\eta_0\eta_0}\right)$$

denotes a ratio of optical power of a $+1^{st}$-order/$-2^{nd}$-order or $-2^{nd}$-order/$0^{th}$-order diffraction beam to optical power of a signal beam, wherein the $+1^{st}$-order/$-2^{nd}$-order or $-2^{nd}$-order/$0^{th}$-order diffraction beam is reflected from a surface of a BD having a rewritable dual layer structure when reproduction is performed with respect to the BD.

As shown in FIG. 8, $$\frac{\eta_{-1}\eta_1}{\eta_0\eta_0} \text{ and } \frac{\eta_2\eta_0}{\eta_1\eta_1}$$

may be minimized when $\phi_2=54.05°$ and each have a value of about 0.1. Thus, when $\eta_0=\eta_1$, $$\frac{\eta_{-1}\eta_1}{\eta_0\eta_0} \text{ and } \frac{\eta_2\eta_0}{\eta_1\eta_1}$$

may each be reduced to be lower than 0.1.

FIG. 9 is a graph showing variations in the efficiencies of $0^{th}$-order, $1^{st}$-order, $-1^{st}$-order, $2^{nd}$-order, and $-2^{nd}$-order diffraction beams according to a phase variation $\phi_1$ when $\phi_2=54.05°$. As shown in FIG. 9, when the efficiencies of the $-1^{st}$-order and $2^{nd}$-order ($-2^{nd}$-order) diffraction beams are minimized, the phase variation $\phi_1$ is about 92.26°. When $\phi_2=54.05°$ is substituted for Equation 5 so that $\phi_1=92.26°$, efficiency of "$\eta_0=\eta_1$" is about 38%, and "$\eta_{-1}=\eta_{+2}=\eta_{-2}$" is about 4%. Therefore, if the conventional hologram optical device technique as disclosed in Japanese Laid-open Patent No. 1992-212730 is used, it is impossible to reduce all of $$\frac{\eta_{-1}\eta_1}{\eta_0\eta_0}, \frac{\eta_2\eta_0}{\eta_1\eta_1}, \text{ and } \frac{\eta_{-2}\eta_1}{\eta_0\eta_0}\left(\frac{\eta_{-2}\eta_0}{\eta_0\eta_0}\right)$$

to be lower than about 0.1.

As described above, when the widths W01, W12, W23, and W34 of the first, second, third, and fourth steps S1', S2', S3', and S4' are the same and the step differences are different, as in the conventional hologram optical device 20" disclosed in Japanese Laid-open Patent No. 1992-212730, phase variations $\phi12$, $\phi23$, and $\phi34$ may be obtained from Equation 6 and have values of 54.05, 38.21, and 54.05, respectively, when $$\frac{\eta_{-1}\eta_1}{\eta_0\eta_0}, \frac{\eta_2\eta_0}{\eta_1\eta_1}, \text{ and } \frac{\eta_{-2}\eta_1}{\eta_0\eta_0}\left(\frac{\eta_{-2}\eta_0}{\eta_0\eta_0}\right)$$

are minimized. When $\eta_0=\eta_1$, a proportion of each of $$\frac{\eta_{-1}\eta_1}{\eta_0\eta_0}, \frac{\eta_2\eta_0}{\eta_1\eta_1}, \text{ and } \frac{\eta_{-2}\eta_1}{\eta_0\eta_0}\left(\frac{\eta_{-2}\eta_0}{\eta_0\eta_0}\right)$$

being minimized is about 10%.

In contrast to the conventional hologram optical device 20", the hologram optical device 20 changes the widths of steps of hologram pattern in order to reduce the proportions of $$\frac{\eta_{-1}\eta_1}{\eta_0\eta_0}, \frac{\eta_2\eta_0}{\eta_1\eta_1}, \text{ and } \frac{\eta_{-2}\eta_1}{\eta_0\eta_0}\left(\frac{\eta_{-2}\eta_0}{\eta_0\eta_0}\right).$$

For example, in the hologram optical device 20 the heights of steps are the same and the widths of the steps are different from one another so as to minimize $$\frac{\eta_{-1}\eta_1}{\eta_0\eta_0}, \frac{\eta_2\eta_0}{\eta_1\eta_1}, \text{ and } \frac{\eta_{-2}\eta_1}{\eta_0\eta_0}\left(\frac{\eta_{-2}\eta_0}{\eta_0\eta_0}\right).$$

The ratios $$\frac{\eta_{-1}\eta_1}{\eta_0\eta_0}, \frac{\eta_2\eta_0}{\eta_1\eta_1}, \text{ and } \frac{\eta_{-2}\eta_1}{\eta_0\eta_0}\left(\frac{\eta_{-2}\eta_0}{\eta_0\eta_0}\right)$$

in the hologram optical device 20 can be numerically calculated from Equations 3 and 4 above. According to examples described herein, when the widths W01 and W34 are equal, and the widths W12 and W23 are equal, the widths W01 and W34 are each changed by "−a," and the widths W12 and W23 are each changed by "+a." Here, "a" denotes a duty variation.

FIG. 10 is a graph showing the efficiencies of $-1^{st}$-order, $-2^{nd}$-order, and $2^{nd}$-order diffraction beams with respect to duty variations when $\eta_0=\eta_1$. FIG. 11 is a graph illustrating ratios of $$\frac{\eta_{-1}\eta_1}{\eta_0\eta_0}, \frac{\eta_2\eta_0}{\eta_1\eta_1}, \text{ and } \frac{\eta_{-2}\eta_1}{\eta_0\eta_0}\left(\frac{\eta_{-2}\eta_0}{\eta_0\eta_0}\right)$$

with respect to duty variations when $\eta_0=\eta_1$. As shown in FIGS. 10 and 11, the efficiencies and the ratios are obtained with respect to the duty variations when a total width T is fixed.

As shown in FIG. 11, when the duty variation a is 0.03T, the ratios of optical powers of noise beams to optical powers of signal beams, i.e., the ratios $$\frac{\eta_{-1}\eta_1}{\eta_0\eta_0}, \frac{\eta_2\eta_0}{\eta_1\eta_1}, \text{ and } \frac{\eta_{-2}\eta_1}{\eta_0\eta_0}\left(\frac{\eta_{-2}\eta_0}{\eta_0\eta_0}\right),$$

may be all minimized. When the duty variation a is 0.03T, the ratios $$\frac{\eta_{-1}\eta_1}{\eta_0\eta_0} \text{ and } \frac{\eta_2\eta_0}{\eta_1\eta_1}$$

are each about 10% and thus almost equal to those of the prior art described with reference to FIG. 8. The ratio $$\frac{\eta_{-2}\eta_1}{\eta_0\eta_0}\left(\frac{\eta_{-2}\eta_0}{\eta_0\eta_0}\right)$$

is about 4.2% and thus can be reduced by about 2.4 times that of the prior art.

Table 1 below shows the diffraction efficiencies and ratios $$\frac{\eta_{-1}\eta_1}{\eta_0\eta_0}, \frac{\eta_2\eta_0}{\eta_1\eta_1}, \text{ and } \frac{\eta_{-2}\eta_1}{\eta_0\eta_0}\left(\frac{\eta_{-2}\eta_0}{\eta_0\eta_0}\right)$$

when the hologram optical device 20, the conventional hologram optical device 20", and the general hologram optical device 20' are used.

1a, is increased. An incident $1^{st}$-order/returned $1^{st}$-order diffraction beam used as a signal beam for the second information storage medium of the second standard, i.e., the HD DVD

TABLE 1

| | Diffraction Efficiency | | | | | $\frac{\eta_{-1}\eta_1}{\eta_0\eta_0}$ | $\frac{\eta_{-2}\eta_1}{\eta_0\eta_0}\left(\frac{\eta_{-2}\eta_0}{\eta_0\eta_0}\right)$ | $\frac{\eta_2\eta_0}{\eta_1\eta_1}$ |
|---|---|---|---|---|---|---|---|---|
| | $0^{th}$-order diffraction beam | $1^{st}$-order diffraction beam | $-1^{st}$-order diffraction beam | $2^{nd}$-order diffraction beam | $-2^{nd}$-order diffraction beam | | | |
| Present Invention (d12 = d34 = d23) (W01 = W34 ≠ W12 = W23) | 38.0% | 38.0% | 4.2% | 4.2% | 1.6% | 11% | 4.2% | 11% |
| Prior Art (d12 = d34 ≠ d23) (W01 = W12 = W23 = W34) | 38.0% | 38.0% | 4.0% | 4.0% | 4.0% | 10.5% | 10.5% | 10.5% |
| General Diffraction Device (d12 = d34 = d23) (W01 = W12 = W23 = W34) | 38.0% | 38.0% | 5.8 | 3 | 3 | 15% | 8% | 8% |

As shown in Table 1, the ratio $$\frac{\eta_2\eta_0}{\eta_1\eta_1}$$

indicating a ratio of noise to a signal beam of a HD DVD is 11% in the case of examples described herein but 10.5% in the case of the prior art. The ratio $$\frac{\eta_2\eta_0}{\eta_1\eta_1}$$

hardly differs in the cases of examples described herein and the prior art. In the case of the present invention the ratios $$\frac{\eta_{-1}\eta_1}{\eta_0\eta_0} \text{ and } \frac{\eta_{-2}\eta_1}{\eta_0\eta_0}\left(\frac{\eta_{-2}\eta_0}{\eta_0\eta_0}\right)$$

indicating ratios of noise to signal beam of a BD is 11% and 4.2%, respectively, and the sum of the ratios is 15.2%. In the case of the prior art, the ratios $$\frac{\eta_{-1}\eta_1}{\eta_0\eta_0} \text{ and } \frac{\eta_{-2}\eta_1}{\eta_0\eta_0}\left(\frac{\eta_{-2}\eta_0}{\eta_0\eta_0}\right)$$

are 10.5% and 10.5%, respectively, and the sum of the ratios is 21%. Thus, the widths of steps of a 4-step stairway of each hologram pattern of a hologram optical device according to aspects of examples described herein can be adjusted to greatly improve a ratio of noise to a signal beam of the BD compared to the prior art.

FIG. 12 shows an example of a hologram pattern of the hologram optical device 20 used to obtain the results of Table 1. As shown in FIG. 12, the hologram optical device 20 may be formed so that a duty variation a is 0.3T, and the heights of the steps each have a phase difference of 0.28π.

When the hologram optical device 20 as shown in FIG. 12 is used, the use efficiency of an incident $0^{th}$-order/returned $0^{th}$-order diffraction beam used as a signal beam for the first information storage medium of the first standard, i.e., the BD 1b, is increased. The use efficiencies of unnecessary diffraction beams, e.g., $-1^{st}$-order, $-2^{nd}$-order, and $2^{nd}$-order diffraction beams are not increased. As a result, a signal-to-noise ratio (SNR) of an information signal can be improved.

As described above, the hologram optical device 20 has a 4-step stairway, the step differences of the four steps of the 4-step stairway are equal, the first and fourth steps have the same width of 0.22T, and the second and third steps have the same width of 0.28T so as to reduce noise beams. However, the examples described herein is not limited thereto. It will be understood by those of ordinary skill in the art that various changes in form and details may be made therein without departing from the spirit and scope of the examples described herein as defined by the following claims.

The hologram optical device 20 may constitute a phase type hologram lens. When the hologram optical device 20 is combined with the objective lens 30, recording and/or reproduction can be performed with respect to a plurality of optical information storage media, e.g., a BD and a HD DVD, using one light source.

FIG. 13 schematically illustrates an example of an optical information storage medium system employing the compatible optical pickup 10. As shown in FIG. 13, the optical information storage medium system includes a spindle motor 312, the compatible optical pickup 10, a driver 307, and a controller 309. The spindle motor 312 rotates an optical information storage medium 1. The compatible optical pickup 10 is moveably installed in a radius direction of the optical information storage medium 1 so as to record and/or reproduce information on and/or from the optical information storage medium 1. The driver 307 drives the spindle motor 312 and the compatible optical pickup 10. The controller 309 controls focus, tracking, and/or tilt servos of the compatible optical pickup 10. Reference numerals 352 and 353 respectively denote a turntable and a clamp that chucks the optical information storage medium 1. The optical information storage medium system may be incorporated into a stand-alone recording and/or reproducing apparatus or may be incorporated into another device, such as a computer or video game console.

A beam reflected from the optical information storage medium 1 is detected by the PD 19 of the compatible optical pickup 10, photoelectrically transformed into an electrical signal, and input to the controller 309 through the driver 307. The driver 307 controls a rotation speed of the spindle motor 312, amplifies an input signal, and drives the compatible optical pickup 10. The controller 309 transmits focus, tracking, and/or tilt servo commands, which are controlled based on the signal input from the driver 307, to the driver 307 so as to realize focusing, tracking, and/or tilt operations. The optical information storage medium system employing the compatible optical pickup 10 of examples described herein may use both a BD and an HD DVD.

As described above, according to a hologram optical device according to examples described herein, when an incident 0th-order/returned 0th-order diffraction beam as a signal beam for a BD and an incident 1st-order/returned 1st-order diffraction beam as a signal beam for a HD DVD is used, the hologram optical device can reduce an inflow of noise generated by unnecessary diffraction beams. Thus, when the hologram optical device is used, a compatible optical pickup and an optical information storage medium system capable of improving signal characteristics of the BD and the HD DVD can be realized.

Although a few examples have been shown and described, it would be appreciated by those skilled in the art that changes may be made in the examples described herein without departing from the principles and spirit thereof, the scope of which is defined in the claims and their equivalents.

What is claimed is:

1. A hologram optical device comprising:
a hologram including a pattern having a 4-step stair period at least one of first, second, third, and fourth steps of the 4-step stair period having a different width from at least one other step,
wherein the hologram is formed such that a phase variation determined by a step difference between the first and second steps is equal to a phase variation determined by a step difference between the second and third steps and is equal to a phase variation determined by a step difference between the third and fourth steps.

2. The hologram optical device of claim 1, wherein widths of the first and fourth steps are equal and widths of the second and third steps are equal and different from the widths of the first and fourth steps.

3. The hologram optical device of claim 1, wherein the hologram is formed such that the widths of the first and fourth steps are equal to each other and equal to or greater than 0.16T and less than 0.25T, and the widths of the second and third steps are equal to each other and each equal to 0.5T—the width of the first step, where T is a width of the period of the pattern.

4. The hologram optical device of claim 1, further comprising:
a first area comprising the hologram; and
a second area comprising a second area hologram including a stair pattern, the second area hologram being formed outside the first area such that a direction of steps in the stair pattern of the second area hologram is symmetrical to that of the steps of the hologram of the first area.

5. A compatible optical pickup that uses both a first optical information storage medium of a first standard and a second optical information storage medium of a second standard, the second optical information storage medium having a different thickness from the first optical information storage medium, the compatible optical pickup comprising:
a light source configured to emit a beam having a predetermined wavelength;
an objective lens configured to focus an incident beam onto an optical information storage medium; and
a hologram optical device configured to diffract the beam incident from the light source as $0^{th}$-order and $1^{st}$-order diffraction beams, the hologram optical device comprising a hologram including a pattern having a 4-step stair period, at least one of first, second, third, and fourth steps of the 4-step stair period having a different width from at least one other step,
wherein the hologram is formed such that a phase variation determined by a step difference between the first and second steps is equal to a phase variation determined by a step difference between the second and third steps and is equal to a phase variation determined by a step difference between the third and fourth steps.

6. The compatible optical pickup of claim 5, wherein widths of the first and fourth steps are equal and widths of the second and third steps are equal but different from the widths of the first and fourth steps.

7. The compatible optical pickup of claim 5, wherein the hologram is formed such that the widths of the first and fourth steps are equal to each other and equal to or greater than 0.16T and less than 0.25T, and the widths of the second and third steps are equal to each other and each equal to 0.5T—the width of the first step, where T is a width of the period of the pattern.

8. The compatible optical pickup of claim 5, wherein the hologram optical device further comprises a first area comprising the hologram, the hologram being configured to diverge a $1^{st}$-order diffraction beam.

9. The compatible optical pickup of claim 8, wherein the hologram optical device further comprises a second area comprising a second area hologram formed outside the first area, the second area hologram being configured to diffract the incident beam as a $0^{th}$-order diffraction beam and a convergent $1^{st}$-order diffraction beam.

10. The compatible optical pickup of claim 9, wherein the second area hologram includes a stair pattern, the second area hologram being formed in the second area such that a direction of steps in the stair pattern of the second area hologram is symmetrical to that of the steps of the hologram of the first area.

11. The compatible optical pickup of claim 9, wherein the second area is formed such that a diffraction efficiency of the $0^{th}$-order diffraction beam is similar to or greater than a diffraction efficiency of the $1^{st}$-order diffraction beam.

12. The compatible optical pickup of claim 8, wherein the first area is formed such that a diffraction efficiency of a $0^{th}$-order diffraction beam is approximate to a diffraction efficiency of the $1^{st}$-order diffraction beam.

13. The compatible optical pickup of claim 5, wherein a thickness of the first optical information storage medium is 0.1 mm, and a thickness of the second optical information storage medium is 0.6 mm.

14. The compatible optical pickup of claim 5, wherein the light source emits a blue beam having a wavelength between 400 nm and 420 nm.

15. The compatible optical pickup of claim 8, wherein:
the objective lens has a first numerical aperture (NA) suitable for the first optical information storage medium of the first standard; and
the first area of the hologram optical device is formed such that an outermost diameter of the first area forms a second NA suitable for the second optical information storage medium of the second standard when the hologram optical device is combined with the objective lens.

16. The compatible optical pickup of claim 15, wherein the first NA is 0.85 and the second NA is 0.65.

17. An optical information storage medium system comprising:
  a compatible optical pickup configured to record and/or reproduce data to/from both a first optical information storage medium of a first standard and a second optical information storage medium of a second standard, the second optical information storage medium having a different thickness from the first optical information storage medium the compatible optical pickup comprising:
    a light source configured to emit a beam having predetermined wavelengths;
    an objective lens configured to focus an incident beam onto an optical information storage medium; and
    a hologram optical device configured to diffract the beam incident from the light source as $0^{th}$-order and $1^{st}$-order diffraction beams, the hologram optical device comprising a hologram including a pattern having a 4-step stair period, at least one of first, second, third, and fourth steps of the 4-step stair period having a different width from at least one other step; and
  a controller configured to control the compatible optical pickup,
  wherein the hologram is formed such that a phase variation determined by a step difference between the first and second steps is equal to a phase variation determined by a step difference between the second and third steps and is equal to a phase variation determined by a step difference between the third and fourth steps.

18. The optical information storage medium system of claim 17, wherein widths of the first and fourth steps are equal and widths of the second and third steps are equal but different from the widths of the first and fourth steps.

19. The optical information storage medium system of claim 17, wherein the hologram is formed such that the widths of the first and fourth steps are equal to each other and equal to or greater than 0.16T and less than 0.25T, and the widths of the second and third steps are equal to each other and each equal to 0.5T—the width of the first step, where T is a width of the period of the pattern.

20. The optical information storage medium system of claim 18, wherein the hologram is formed such that that the widths of the first and fourth steps are equal to each other and equal to or greater than 0.16T and less than 0.25T, and the widths of the second and third steps are equal to each other and each equal to 0.5T—the width of the first step, where T is a width of the period of the pattern.

21. The optical information storage medium system of claim 17, wherein the hologram optical device further comprises a first area comprising the hologram, the hologram being configured to diverge a $1^{st}$-order diffraction beam.

22. The optical information storage medium system of claim 21, wherein the hologram optical device further comprises a second area formed outside the first area to diffract incident beams as a $0^{th}$-order diffraction beam and a convergent $1^{st}$-order diffraction beam.

23. The optical information storage medium system of claim 22, wherein the second area comprises a second area hologram including a stair pattern, the second area hologram being formed such that a direction of steps in the step-shaped hologram stair pattern of the second area hologram is symmetrical to that of the steps of the hologram of the first area.

24. The optical information storage medium system of claim 22, wherein the second area is formed such that a diffraction efficiency of the $0^{th}$-order diffraction beam is similar to or greater than a diffraction efficiency of the $1^{st}$-order diffraction beam.

25. The optical information storage medium system of claim 21, wherein the first area is formed such that a diffraction efficiency of the $0^{th}$-order diffraction beam is approximate to a diffraction efficiency of the $1^{st}$-order diffraction beam.

26. The optical information storage medium system of claim 17, wherein a thickness of the first optical information storage medium is 0.1 mm, and a thickness of the second optical information storage medium is 0.6 mm.

27. The optical information storage medium system of claim 17, wherein the first optical information storage medium corresponds to a Blu-ray disc standard, and the second optical information storage medium corresponds to a high-definition digital versatile disc standard.

28. The optical information storage medium system of claim 27, wherein the light source emits a blue beam having a wavelength between 400 nm and 420 nm.

29. The optical information storage medium system of claim 21, wherein:
  the objective lens has a first numerical aperture (NA) suitable for the first optical information storage medium of the first standard; and
  the first area of the hologram optical device is formed such that an outermost diameter of the first area forms a second NA suitable for the second optical information storage medium of second standard when the hologram optical device is combined with the objective lens.

30. The optical information storage medium system of claim 29, wherein the first NA is 0.85, and the second NA is 0.65.

31. A reproducing and/or recording apparatus to record and/or reproduce data from a first optical information storage medium according to a first standard and a second optical information storage medium according to a second standard, the apparatus comprising:
  an optical pickup configured to record data onto and/or reproduce data from the first and/or second optical storage medium and having a light source to emit a beam of predetermined wavelengths;
  an objective lens configured to focus the beam onto the first and/or second optical information storage medium;
  a hologram optical device to diffract the beam as $0^{th}$-order and $1^{st}$-order diffraction beams the hologram optical device comprising a hologram including a pattern having a 4-step stair period at least one of first, second, third, and fourth steps of the 4-step stair period having a width different from a width of at least one other step;
  a driver configured to drive the optical pickup; and
  a controller configured to control the drive such that data is reproduced and/or recorded,
  wherein the hologram is formed such that a phase variation determined by a step difference between the first and second steps is equal to a phase variation determined by a step difference between the second and third steps and is equal to a phase variation determined by a step difference between the third and fourth steps.

32. The apparatus of claim 31, wherein:
  the width of the first step is equal to the width of the fourth step; and
  the width of the second step is equal to the width of the third step.

33. The apparatus of claim 31, wherein the hologram is formed such that a diffraction efficiency of a $-2^{nd}$-order diffraction beam passing through the hologram is approximately 1.6%.

34. The apparatus of claim 31, wherein the hologram optical device further comprises:

a first area comprising the hologram; and a second area outside the first area, the second area comprising a second area hologram including a stair pattern, the second area hologram being formed such that a direction of steps in the stair pattern of the second area hologram is symmetrical to that of the steps of the hologram of the first area.

35. The apparatus of claim 31, wherein the hologram is formed such that a diffraction efficiency of a $0^{th}$-order diffraction beam is equal to or greater than a diffraction efficiency of a $1^{st}$-order diffraction beam.

36. The hologram optical device of claim 1, wherein the respective step differences are equal to one another.

37. The compatible optical pickup of claim 5, wherein the respective step differences are equal to one another.

38. The optical information storage medium system of claim 17, wherein the respective step differences are equal to one another.

39. The apparatus of claim 31, wherein the respective step differences are equal to one another.

* * * * *